(12) United States Patent
Enge et al.

(10) Patent No.: US 8,416,339 B2
(45) Date of Patent: *Apr. 9, 2013

(54) PROVIDING MULTIPLE VIDEO SIGNALS FROM SINGLE SENSOR

(75) Inventors: Amy D. Enge, Spencerport, NY (US); John T. Compton, LeRoy, NY (US); Bruce H. Pillman, Rochester, NY (US)

(73) Assignee: Omni Vision Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,512

(22) Filed: Aug. 29, 2011

(65) Prior Publication Data

US 2011/0310279 A1    Dec. 22, 2011

Related U.S. Application Data

(63) Continuation of application No. 11/538,599, filed on Oct. 4, 2006, now Pat. No. 8,031,258.

(51) Int. Cl.
  *H04N 5/232*  (2006.01)
  *H04N 5/235*  (2006.01)
  *H04N 5/222*  (2006.01)
  *G03B 13/00*  (2006.01)

(52) U.S. Cl.
  USPC .................. 348/350; 348/221.1; 348/333.11

(58) Field of Classification Search .......... None
  See application file for complete search history.

(56) References Cited

U.S. PATENT DOCUMENTS

| | | |
|---|---|---|
| 2,446,791 A | 8/1948 | Schroeder |
| 2,508,267 A | 5/1950 | Kasperowicz |
| 2,884,483 A | 4/1959 | Ehrenhaft et al. |
| 3,725,572 A | 4/1973 | Kurokawa et al. |
| 3,971,065 A | 7/1976 | Bayer |
| 4,047,203 A | 9/1977 | Dillon |
| 4,121,244 A | 10/1978 | Nakabe et al. |
| 4,390,895 A | 6/1983 | Sato et al. |
| 4,437,112 A | 3/1984 | Tanaka et al. |
| 4,567,510 A | 1/1986 | Tanaka et al. |

(Continued)

FOREIGN PATENT DOCUMENTS

| | | |
|---|---|---|
| EP | 0 119 862 A2 | 9/1984 |
| EP | 0 138 074 B1 | 12/1989 |

(Continued)

OTHER PUBLICATIONS

JP 2009-531389—Japanese Office Action with English translation, mail date Feb. 14, 2012, 5 pages.

(Continued)

*Primary Examiner* — Albert Cutler
(74) *Attorney, Agent, or Firm* — Blakely Sokoloff Taylor & Zafman LLP (57) ABSTRACT

A method for using a capture device to capture at least two video signals corresponding to a scene, includes: providing a two-dimensional image sensor having a plurality of pixels; reading a first group of pixels from the image sensor at a first frame rate to produce a first video signal of the image scene; reading a second group of pixels from the image sensor at a second frame rate for producing a second video signal; and using at least one of the video signals for adjusting one or more of the capture device parameters.

11 Claims, 6 Drawing Sheets

U.S. PATENT DOCUMENTS

| | | |
|---|---|---|
| 4,591,900 A | 5/1986 | Heeb et al. |
| 4,606,630 A | 8/1986 | Haruki et al. |
| 4,642,678 A | 2/1987 | Cok |
| 4,663,661 A | 5/1987 | Weldy et al. |
| 4,760,441 A | 7/1988 | Kohno |
| 4,805,024 A | 2/1989 | Suzuki et al. |
| 4,807,981 A | 2/1989 | Takizawa et al. |
| 4,823,186 A | 4/1989 | Muramatsu |
| 4,896,207 A | 1/1990 | Parulski |
| 4,939,573 A | 7/1990 | Teranishi et al. |
| 4,956,715 A | 9/1990 | Okino et al. |
| 4,962,419 A | 10/1990 | Hibbard et al. |
| 5,018,006 A | 5/1991 | Hashimoto |
| 5,172,220 A | 12/1992 | Beis |
| 5,227,313 A | 7/1993 | Gluck et al. |
| 5,244,817 A | 9/1993 | Hawkins et al. |
| 5,264,924 A | 11/1993 | Cok |
| 5,272,518 A | 12/1993 | Vincent |
| 5,323,233 A | 6/1994 | Yamagami et al. |
| 5,373,322 A | 12/1994 | Laroche et al. |
| 5,374,956 A | 12/1994 | D'Luna |
| 5,382,976 A | 1/1995 | Hibbard |
| 5,432,906 A | 7/1995 | Newman et al. |
| 5,493,335 A | 2/1996 | Parulski et al. |
| 5,506,619 A | 4/1996 | Adams, Jr. et al. |
| 5,596,367 A | 1/1997 | Hamilton, Jr. et al. |
| 5,625,210 A | 4/1997 | Lee et al. |
| 5,629,734 A | 5/1997 | Hamilton, Jr. et al. |
| 5,631,703 A | 5/1997 | Hamilton, Jr. et al. |
| 5,652,621 A | 7/1997 | Adams, Jr. et al. |
| 5,670,817 A | 9/1997 | Robinson |
| 5,677,202 A | 10/1997 | Hawkins et al. |
| 5,773,814 A | 6/1998 | Phillips et al. |
| 5,852,468 A | 12/1998 | Okada |
| 5,877,809 A | 3/1999 | Omata et al. |
| 5,914,749 A | 6/1999 | Bawolek et al. |
| 5,917,956 A | 6/1999 | Ohsawa et al. |
| 5,969,368 A | 10/1999 | Thompson et al. |
| 6,011,875 A | 1/2000 | Laben |
| 6,097,835 A | 8/2000 | Lindgren |
| 6,107,655 A | 8/2000 | Guidash |
| 6,115,066 A | 9/2000 | Gowda et al. |
| 6,153,446 A | 11/2000 | Chen et al. |
| 6,168,965 B1 | 1/2001 | Malinovich et al. |
| 6,243,133 B1 | 6/2001 | Spaulding et al. |
| 6,246,865 B1 | 6/2001 | Lee |
| 6,271,554 B1 | 8/2001 | Nozaki et al. |
| 6,292,212 B1 | 9/2001 | Zigadlo et al. |
| 6,326,624 B1 | 12/2001 | Chapuis et al. |
| 6,366,318 B1 | 4/2002 | Smith et al. |
| 6,366,319 B1 | 4/2002 | Bills |
| 6,369,853 B1 | 4/2002 | Merrill et al. |
| 6,429,036 B1 | 8/2002 | Nixon et al. |
| 6,441,848 B1 | 8/2002 | Tull |
| 6,441,852 B1 | 8/2002 | Levine et al. |
| 6,441,855 B1 | 8/2002 | Omata et al. |
| 6,476,865 B1 | 11/2002 | Gindele et al. |
| 6,510,283 B1 | 1/2003 | Yamagishi |
| 6,512,838 B1 | 1/2003 | Rafii et al. |
| 6,515,275 B1 | 2/2003 | Hunter et al. |
| 6,529,239 B1 | 3/2003 | Dyck et al. |
| 6,594,388 B1 | 7/2003 | Gindele et al. |
| 6,630,960 B2 | 10/2003 | Takahashi et al. |
| 6,642,962 B1 | 11/2003 | Lin et al. |
| 6,646,246 B1 | 11/2003 | Gindele et al. |
| 6,654,062 B1 | 11/2003 | Numata et al. |
| 6,665,449 B1 | 12/2003 | He et al. |
| 6,686,960 B2 | 2/2004 | Iizuka |
| 6,694,064 B1 | 2/2004 | Benkelman |
| 6,714,243 B1 | 3/2004 | Mathur et al. |
| 6,734,906 B1 | 5/2004 | Hashimoto |
| 6,757,012 B1 | 6/2004 | Hubina et al. |
| 6,765,611 B1 | 7/2004 | Gallagher et al. |
| 6,784,939 B1 | 8/2004 | Lee et al. |
| 6,809,008 B1 | 10/2004 | Holm et al. |
| 6,813,046 B1 | 11/2004 | Gindele et al. |
| 6,829,008 B1 | 12/2004 | Kondo et al. |
| 6,847,397 B1 | 1/2005 | Osada |
| 6,869,817 B2 | 3/2005 | Hwang |
| 6,876,384 B1 | 4/2005 | Hubina et al. |
| 6,885,819 B2 | 4/2005 | Shinohara |
| 6,927,432 B2 | 8/2005 | Holm et al. |
| 6,937,774 B1 | 8/2005 | Specht et al. |
| 6,943,051 B2 | 9/2005 | Augusto et al. |
| 6,943,831 B2 | 9/2005 | Gallagher et al. |
| 6,972,799 B1 | 12/2005 | Hashimoto |
| 6,984,816 B2 | 1/2006 | Holm et al. |
| 6,995,795 B1 | 2/2006 | Losee et al. |
| 7,009,638 B2 | 3/2006 | Gruber et al. |
| 7,012,643 B2 | 3/2006 | Frame |
| 7,016,089 B2 | 3/2006 | Yoneda et al. |
| 7,016,549 B1 | 3/2006 | Utagawa |
| 7,065,246 B2 | 6/2006 | Xiaomang et al. |
| 7,075,129 B2 | 7/2006 | Parks |
| 7,109,051 B2 | 9/2006 | Cave et al. |
| 7,148,925 B2 | 12/2006 | Osada et al. |
| 7,153,720 B2 | 12/2006 | Augusto |
| 7,161,625 B2 | 1/2007 | Hori |
| 7,199,830 B1 | 4/2007 | Tanaka et al. |
| 7,206,072 B2 | 4/2007 | Takahashi et al. |
| 7,239,342 B2 | 7/2007 | Kingetsu et al. |
| 7,251,054 B2 | 7/2007 | Takemoto |
| 7,298,922 B1 | 11/2007 | Lindgren et al. |
| 7,315,014 B2 | 1/2008 | Lee et al. |
| 7,327,504 B2 | 2/2008 | Gallagher |
| 7,330,209 B2 | 2/2008 | Osamato |
| 7,340,099 B2 | 3/2008 | Zhang |
| 7,343,867 B2 | 3/2008 | Fraisse et al. |
| 7,349,016 B2 | 3/2008 | Fujii et al. |
| 7,379,588 B2 | 5/2008 | Loce et al. |
| 7,400,332 B2 | 7/2008 | Schweng et al. |
| 7,400,770 B2 | 7/2008 | Keaton et al. |
| 7,453,129 B2 | 11/2008 | King et al. |
| 7,454,053 B2 | 11/2008 | Bryll et al. |
| 7,456,880 B2 | 11/2008 | Okita et al. |
| 7,468,750 B2 | 12/2008 | Mabuchi et al. |
| 7,485,903 B2 | 2/2009 | Abe et al. |
| 7,521,737 B2 | 4/2009 | Augusto |
| 7,554,588 B2 | 6/2009 | Yaffe |
| 7,577,315 B2 | 8/2009 | Uvarov et al. |
| 7,615,808 B2 | 11/2009 | Pain et al. |
| 7,688,368 B2 | 3/2010 | Kijima et al. |
| 7,706,022 B2 | 4/2010 | Okuyama |
| 7,724,292 B2 | 5/2010 | Ueno et al. |
| 7,769,229 B2 | 8/2010 | O'Brien et al. |
| 7,769,230 B2 | 8/2010 | Pillman et al. |
| 7,807,955 B2 | 10/2010 | Parks et al. |
| 7,821,553 B2 | 10/2010 | Ellis-Monaghan et al. |
| 7,830,430 B2 | 11/2010 | Adams, Jr. et al. |
| 7,839,437 B2 | 11/2010 | Kasai et al. |
| 7,859,033 B2 | 12/2010 | Brady |
| 7,876,956 B2 | 1/2011 | Adams, Jr. et al. |
| 7,893,976 B2 | 2/2011 | Compton et al. |
| 7,915,067 B2 | 3/2011 | Brady et al. |
| 7,916,362 B2 | 3/2011 | Kijima et al. |
| 7,999,870 B2 | 8/2011 | Compton et al. |
| 8,017,426 B2 | 9/2011 | Brady |
| 8,031,258 B2 * | 10/2011 | Enge et al. ............ 348/350 |
| 8,076,170 B2 | 12/2011 | Brady |
| 8,106,427 B2 | 1/2012 | Parks et al. |
| 8,119,435 B2 | 2/2012 | Brady |
| 8,139,130 B2 | 3/2012 | Compton et al. |
| 8,164,682 B2 | 4/2012 | Border et al. |
| 8,174,601 B2 | 5/2012 | Compton et al. |
| 8,184,184 B2 | 5/2012 | Xue |
| 8,194,296 B2 | 6/2012 | Compton et al. |
| 2001/0010952 A1 | 8/2001 | Abramovich |
| 2001/0012133 A1 | 8/2001 | Yoneda et al. |
| 2001/0026683 A1 | 10/2001 | Morimoto et al. |
| 2001/0055064 A1 | 12/2001 | Minakami |
| 2002/0020845 A1 | 2/2002 | Ogura et al. |
| 2002/0044209 A1 | 4/2002 | Saito |
| 2002/0058353 A1 | 5/2002 | Merrill |
| 2002/0130957 A1 | 9/2002 | Gallagher et al. |
| 2002/0135689 A1 | 9/2002 | Uya |
| 2003/0035917 A1 | 2/2003 | Hyman |
| 2003/0160886 A1 | 8/2003 | Misawa et al. |

| | | |
|---|---|---|
| 2003/0193580 A1 | 10/2003 | Okamoto |
| 2003/0210332 A1 | 11/2003 | Frame |
| 2004/0007722 A1 | 1/2004 | Narui et al. |
| 2004/0032516 A1 | 2/2004 | Kakarala |
| 2004/0046881 A1 | 3/2004 | Utagawa |
| 2004/0090550 A1 | 5/2004 | Park |
| 2004/0094784 A1 | 5/2004 | Rhodes et al. |
| 2004/0169747 A1 | 9/2004 | Ono et al. |
| 2004/0174446 A1 | 9/2004 | Acharya |
| 2004/0207823 A1 | 10/2004 | Alasaarela et al. |
| 2004/0212714 A1 | 10/2004 | Mikoshiba et al. |
| 2004/0227456 A1 | 11/2004 | Matsui |
| 2005/0001915 A1 | 1/2005 | Mabuchi et al. |
| 2005/0094071 A1 | 5/2005 | Akiyama et al. |
| 2005/0104148 A1 | 5/2005 | Yamamoto et al. |
| 2005/0110002 A1 | 5/2005 | Noda |
| 2005/0116251 A1 | 6/2005 | Abe et al. |
| 2005/0128586 A1 | 6/2005 | Sedlmayr |
| 2005/0135709 A1 | 6/2005 | Gusmano et al. |
| 2005/0139945 A1 | 6/2005 | Lim |
| 2005/0151729 A1 | 7/2005 | Akimoto et al. |
| 2005/0221541 A1 | 10/2005 | Metzler et al. |
| 2005/0231618 A1 | 10/2005 | Sugiyama |
| 2005/0248667 A1 | 11/2005 | Schweng et al. |
| 2005/0259169 A1 | 11/2005 | Ito et al. |
| 2005/0276475 A1 | 12/2005 | Sawada |
| 2006/0007337 A1 | 1/2006 | Panicacci |
| 2006/0017829 A1 | 1/2006 | Gallagher |
| 2006/0017837 A1 | 1/2006 | Sorek et al. |
| 2006/0033129 A1 | 2/2006 | Mouli |
| 2006/0043189 A1 | 3/2006 | Agrawal et al. |
| 2006/0043393 A1 | 3/2006 | Okita et al. |
| 2006/0043438 A1 | 3/2006 | Holm et al. |
| 2006/0043439 A1 | 3/2006 | Koizumi |
| 2006/0044427 A1 | 3/2006 | Hu |
| 2006/0044434 A1 | 3/2006 | Okita et al. |
| 2006/0050162 A1 | 3/2006 | Nakamura |
| 2006/0055800 A1 | 3/2006 | Ackland et al. |
| 2006/0060854 A1 | 3/2006 | Wakano et al. |
| 2006/0068586 A1 | 3/2006 | Pain |
| 2006/0088298 A1 | 4/2006 | Frame et al. |
| 2006/0113459 A1 | 6/2006 | Yang et al. |
| 2006/0115749 A1 | 6/2006 | Toyoda |
| 2006/0119710 A1 | 6/2006 | Ben-Ezra et al. |
| 2006/0119738 A1 | 6/2006 | Kido |
| 2006/0139245 A1 | 6/2006 | Sugiyama |
| 2006/0146157 A1 | 7/2006 | Toros et al. |
| 2006/0146158 A1 | 7/2006 | Toros et al. |
| 2006/0186560 A1 | 8/2006 | Swain et al. |
| 2006/0187308 A1 | 8/2006 | Lim et al. |
| 2006/0192873 A1 | 8/2006 | Yaffe |
| 2006/0204122 A1 | 9/2006 | Onozawa |
| 2006/0275944 A1 | 12/2006 | Hyun |
| 2007/0002153 A1 | 1/2007 | Dierickx |
| 2007/0024879 A1 | 2/2007 | Hamilton, Jr. et al. |
| 2007/0024931 A1 | 2/2007 | Compton et al. |
| 2007/0029465 A1 | 2/2007 | Choi et al. |
| 2007/0030366 A1 | 2/2007 | Compton |
| 2007/0040922 A1 | 2/2007 | McKee et al. |
| 2007/0045681 A1 | 3/2007 | Mauritzson et al. |
| 2007/0046807 A1 | 3/2007 | Hamilton, Jr. et al. |
| 2007/0069215 A1 | 3/2007 | Ohta |
| 2007/0069258 A1 | 3/2007 | Ahn |
| 2007/0071433 A1 | 3/2007 | Kawanami |
| 2007/0076269 A1 | 4/2007 | Kido et al. |
| 2007/0096232 A1 | 5/2007 | Hwang |
| 2007/0127040 A1 | 6/2007 | Davidovici |
| 2007/0138588 A1 | 6/2007 | Wilson et al. |
| 2007/0146522 A1 | 6/2007 | Okada et al. |
| 2007/0154202 A1 | 7/2007 | Lee et al. |
| 2007/0158772 A1 | 7/2007 | Boettiger |
| 2007/0159542 A1 | 7/2007 | Luo |
| 2007/0177236 A1 | 8/2007 | Kijima et al. |
| 2007/0194397 A1 | 8/2007 | Adkisson et al. |
| 2007/0210244 A1 | 9/2007 | Halvis et al. |
| 2007/0223831 A1 | 9/2007 | Mei et al. |
| 2007/0235829 A1 | 10/2007 | Levine et al. |
| 2007/0244359 A1 | 10/2007 | Cabiri et al. |
| 2007/0257998 A1 | 11/2007 | Inoue |
| 2007/0268533 A1 | 11/2007 | Kijima et al. |
| 2007/0285548 A1 | 12/2007 | Gomi |
| 2008/0002959 A1 | 1/2008 | Border et al. |
| 2008/0012969 A1 | 1/2008 | Kasai et al. |
| 2008/0038864 A1 | 2/2008 | Yoo et al. |
| 2008/0074521 A1 | 3/2008 | Olsen |
| 2008/0084486 A1 | 4/2008 | Enge et al. |
| 2008/0128598 A1 | 6/2008 | Kanai et al. |
| 2008/0129834 A1 | 6/2008 | Dosluoglu |
| 2008/0130073 A1 | 6/2008 | Compton et al. |
| 2008/0130991 A1 | 6/2008 | O'Brien et al. |
| 2008/0144964 A1 | 6/2008 | Soinio et al. |
| 2008/0165815 A1 | 7/2008 | Kamijima |
| 2008/0170848 A1 | 7/2008 | Wernersson |
| 2008/0211943 A1 | 9/2008 | Egawa et al. |
| 2008/0218597 A1 | 9/2008 | Cho |
| 2008/0218613 A1 | 9/2008 | Janson et al. |
| 2008/0219654 A1 | 9/2008 | Border et al. |
| 2008/0255409 A1 | 10/2008 | Graumann et al. |
| 2008/0258045 A1 | 10/2008 | Oike et al. |
| 2008/0297634 A1 | 12/2008 | Uya |
| 2009/0016390 A1 | 1/2009 | Sumiyama et al. |
| 2009/0021588 A1 | 1/2009 | Border et al. |
| 2009/0021612 A1 | 1/2009 | Hamilton, Jr. et al. |
| 2009/0057801 A1 | 3/2009 | Goushcha et al. |
| 2009/0096991 A1 | 4/2009 | Chien et al. |
| 2009/0101796 A1 | 4/2009 | Ladd et al. |
| 2009/0109172 A1 | 4/2009 | Lee et al. |
| 2009/0121306 A1 | 5/2009 | Ishikawa |
| 2009/0141242 A1 | 6/2009 | Silverstein et al. |
| 2009/0160993 A1 | 6/2009 | Kato et al. |
| 2009/0167893 A1 | 7/2009 | Susanu et al. |
| 2009/0179995 A1 | 7/2009 | Fukumoto et al. |
| 2009/0195681 A1 | 8/2009 | Compton et al. |
| 2009/0206377 A1 | 8/2009 | Swain et al. |
| 2009/0289169 A1 | 11/2009 | Yang et al. |
| 2009/0290043 A1 | 11/2009 | Liu et al. |
| 2010/0006908 A1 | 1/2010 | Brady |
| 2010/0006909 A1 | 1/2010 | Brady |
| 2010/0006963 A1 | 1/2010 | Brady |
| 2010/0006970 A1 | 1/2010 | Brady et al. |
| 2010/0059802 A1 | 3/2010 | Chen |
| 2010/0091169 A1 | 4/2010 | Border et al. |
| 2010/0141822 A1 | 6/2010 | Xue |
| 2010/0149396 A1 | 6/2010 | Summa |
| 2010/0157120 A1 | 6/2010 | Compton et al. |
| 2010/0302418 A1 | 12/2010 | Adams, Jr. et al. |
| 2010/0302423 A1 | 12/2010 | Adams, Jr. et al. |
| 2010/0309340 A1 | 12/2010 | Border et al. |
| 2010/0309347 A1 | 12/2010 | Adams, Jr. et al. |
| 2010/0309350 A1 | 12/2010 | Adams, Jr. et al. |
| 2011/0042770 A1 | 2/2011 | Brady |
| 2011/0059572 A1 | 3/2011 | Brady |
| 2011/0073173 A1 | 3/2011 | Hwang |
| 2011/0115957 A1 | 5/2011 | Brady et al. |
| 2011/0147875 A1 | 6/2011 | Parks et al. |
| 2011/0211109 A1 | 9/2011 | Compton et al. |
| 2011/0285880 A1 | 11/2011 | Brady |

FOREIGN PATENT DOCUMENTS

| | | |
|---|---|---|
| EP | 0 472 299 A1 | 2/1992 |
| EP | 0 528 433 A2 | 2/1993 |
| EP | 0 954 032 A2 | 11/1999 |
| EP | 1 035 729 A2 | 9/2000 |
| EP | 1 206 119 A2 | 5/2002 |
| EP | 1 241 896 A2 | 9/2002 |
| EP | 1 322 123 A2 | 6/2003 |
| EP | 1 411 471 A2 | 4/2004 |
| EP | 1 209 903 B1 | 8/2004 |
| EP | 1 594 321 A2 | 11/2005 |
| EP | 1 612 863 A2 | 1/2006 |
| EP | 1 641 045 A2 | 3/2006 |
| EP | 1 648 160 A1 | 4/2006 |
| EP | 1 709 901 A2 | 10/2006 |
| EP | 1 808 894 A1 | 7/2007 |
| EP | 1 821 128 A1 | 8/2007 |
| GB | 2 105 143 A | 3/1983 |
| JP | 62-246033 A | 10/1987 |
| JP | 63-039293 A | 2/1988 |

| | | | |
|---|---|---|---|
| JP | 01077288 A | 3/1989 |
| JP | 04-088784 | 3/1992 |
| JP | 61-13310 A | 4/1994 |
| JP | 8023542 A | 1/1996 |
| JP | 08-182005 | 7/1996 |
| JP | 2002-270809 | 9/2002 |
| JP | 2004-147093 | 5/2004 |
| JP | 2004-304706 | 10/2004 |
| JP | 2005-099160 A | 4/2005 |
| JP | 2005-268738 A | 9/2005 |
| JP | 2005-277513 A | 10/2005 |
| JP | 2007-104178 A | 4/2007 |
| JP | 2007-150643 A | 6/2007 |
| JP | 2007-271667 A1 | 10/2007 |
| WO | WO 99/59345 | 11/1999 |
| WO | WO 2005/079199 A2 | 9/2005 |
| WO | WO 2006/064564 A1 | 6/2006 |
| WO | WO 2006/130518 A1 | 12/2006 |
| WO | WO 2007/015765 A2 | 2/2007 |
| WO | WO 2007/015982 A2 | 2/2007 |
| WO | WO 2007/030226 A2 | 3/2007 |
| WO | WO 2007/051147 A2 | 5/2007 |
| WO | WO 2007/089416 A1 | 8/2007 |
| WO | WO 2007/089426 A1 | 8/2007 |
| WO | WO 2007/126288 A1 | 11/2007 |
| WO | WO 2007/139675 A2 | 12/2007 |
| WO | WO 2007/145373 A2 | 12/2007 |
| WO | WO 2008/044673 A1 | 4/2008 |
| WO | WO 2008/045198 A2 | 4/2008 |
| WO | WO 2008/066699 A2 | 6/2008 |
| WO | WO 2008/066703 A2 | 6/2008 |
| WO | WO 2008/069920 A1 | 6/2008 |
| WO | WO 2008/106282 A1 | 9/2008 |
| WO | WO 2008/118525 A1 | 10/2008 |

OTHER PUBLICATIONS

Razavi, B., "Design of a 100-MHz 10-mW 3-V Sample-and-Hold Amplifier in Digital Bipolar Technology," IEEE Journal of Solid-State Circuits, vol. 30, No. 7, Jul. 1995, New York, pp. 724-730.
Razavi, B., "Design of Sample-and-Hold Amplifiers for High-Speed Low-Voltage A/D Converters," Integrated Circuits and Systems Laboratory, University of California, Los Angeles, IEEE 1997 Custom Integrated Circuits Conference, 5.1.1-5.1.8, pp. 59-66.
de Bethune, S. et al., "Adaptive Intensity Matching Filters: A New Tool for Multi-Resolution Data Fusion," Scientific congresses and symposiums: Paper published in a book, Agard Conference Proceedings S95, pp. 28.1-28.15, 1998, Lisbon, Portugal, 14 pages downloaded from http://orbi.ulg.ac.be/handle/2268/4739.
Pohl, C. et al., Review article, "Multisensor image fusion in remote sensing: concepts, methods and applications," Int. J. Remote Sensing, 1998, vol. 19, No. 5, pp. 823-854.
Tico, M. et al., "Motion Blur Identification Based on Differently Exposed Images," IEEE International Conference on Image Processing, ICIP 2006, Nokia Research Center, Finland, pp. 2021-2024.
Tico, M. et al., "Image Stabilization Based on Fusing the Visual Information in Differently Exposed Images," IEEE International Conference on Image Processing, ICIP 2007, Nokia Research Center, Finland, pp. I-117-I-120.
Joy, T. et al., "Development of a Production-Ready, Back-Illuminated CMOS Image Sensor with Small Pixels," IEEE, Dec. 2007, pp. 1007-1010.
Yuan, X. et al., "Gate-Induced-Drain-Leakage Current in 45-nm CMOS Technology," IEEE Transactions on Device and Materials Reliability, vol. 8, No. 3, Sep. 2008, pp. 501-508.
Tai, Y. et al., "ImageNideo Deblurring using a Hybrid Camera," IEEE 2008, Microsoft Research Asia, 8 pages.
U.S. Office Action mailed Nov. 12, 2009, U.S. Appl. No. 11/538,599, filed Oct. 4, 2006, 20 pages.
U.S. Office Action mailed May 3, 2010, U.S. Appl. No. 11/538,599, filed Oct. 4, 2006, 16 pages.
U.S. Office Action mailed Jul. 22, 2010, U.S. Appl. No. 11/538,599, filed Oct. 4, 2006, 17 pages.
U.S. Office Action mailed Dec. 13, 2010, U.S. Appl. No. 11/538,599, filed Oct. 4, 2006, 14 pages.
U.S. Notice of Allowance mailed Jun. 2, 2011, U.S. Appl. No. 11/538,599, filed Oct. 4, 2006, 11 pages.
PCT/US2006/028493; International Search Report, mail date May 25, 2007, 2 pages.
PCT/US2006/028493; International Preliminary Report on Patentability, date of issuance Jan. 29, 2008, 6 pages.
PCT/US2006/027454; International Search Report, mail date Dec. 21, 2006, 3 pages.
PCT/US2006/027454; International Preliminary Report on Patentability, date of issuance Jan. 29, 2008, 8 pages.
PCT/US2007/020612; International Search Report, mail date Apr. 21, 2008, 2 pages.
PCT/US2007/020612; International Preliminary Report on Patentability, date of issuance Apr. 7, 2009, 6 pages.
PCT/US2007/001113; International Search Report, mail date Jul. 2, 2007, 2 pages.
PCT/US2007/001113; International Preliminary Report on Patentability, date of issuance Jul. 29, 2008, 5 pages.
PCT/US2007/000955; International Search Report, mail date Jun. 26, 2007, 3 pages.
PCT/US2007/000955; International Preliminary Report on Patentability, date of issuance Jul. 29, 2008, 8 pages.
PCT/US2007/011276; International Search Report and Written Opinion, mail date Feb. 7, 2008, 9 pages.
PCT/US2007/024162; International Search Report and Written Opinion, mail date May 14, 2008, 11 pages.
PCT/US2007/023823; International Search Report and Written Opinion, mail date Oct. 23, 2008, 16 pages.
PCT/US2007/022780; International Search Report and Written Opinion, mail date Apr. 7, 2008, 13 pages.
PCT/US2007/023822; International Search Report and Written Opinion, mail date Oct. 23, 2008, 17 pages.
PCT/US2009/000548; International Search Report and Written Opinion, mail date Jun. 3, 2009, 16 pages.
PCT/US2009/004903; International Search Report and Written Opinion, mail date Nov. 9, 2009, 8 pages.
PCT/US2009/006416; International Search Report and Written Opinion, mail date Mar. 29, 2010, 8 pages.
PCT/US2009/006259; International Search Report and Written Opinion, mail date Mar. 4, 2010, 10 pages.
PCT/US2009/003974; International Search Report and Written Opinion, mail date Oct. 12, 2009, 7 pages.
PCT/US2009/003977; International Search Report and Written Opinion, mail date Mar. 26, 2010, 13 pages.
PCT/US2009/003794; International Search Report and Written Opinion, mail date Sep. 30, 2009, 9 pages.
PCT/US2009/006472; International Search Report and Written Opinion, mail date Mar. 25, 2010, 10 pages.
PCT/US2009/002921; International Search Report and Written Opinion, mail date Sep. 18, 2009, 8 pages.
PCT/US2010/001515; International Search Report and Written Opinion, mail date Sep. 3, 2010, 10 pages.
PCT/US2009/005533; International Search Report and Written Opinion, mail date Dec. 4, 2009, 9 pages.
PCT/US2010/060393; International Search Report and Written Opinion, mail date Feb. 15, 2011, 11 pages.

* cited by examiner

PROVIDING MULTIPLE VIDEO SIGNALS FROM SINGLE SENSOR

CROSS REFERENCE TO RELATED APPLICATIONS

This application is a continuation of U.S. application Ser. No. 11/538,599, filed 4 Oct. 2006, and claims priority therefrom under 35 U.S.C. §120. The priority application is still pending.

The present application is related to U.S. application Ser. No. 11/191,538, filed 28 Jul. 2006, of John F. Hamilton Jr. and John T. Compton, entitled "PROCESSING COLOR AND PANCHROMATIC PIXELS" and U.S. application Ser. No. 11/191,729, filed 28 Jul. 2005, of John T. Compton and John F. Hamilton, Jr., entitled "IMAGE SENSOR WITH IMPROVED LIGHT SENSITIVITY".

FIELD OF THE INVENTION

This invention relates to an image capture device that includes a two-dimensional image sensor that produces two video signals having different frame rates and are used for different functions.

BACKGROUND OF THE INVENTION

An image capture device depends on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). Typically, electronic image sensors are used for the multiple functions related to pre-photography preparations from the video signal in addition to creating the final visual image. Based on brightness measurement results of the subject, automatic exposure control processing (hereinafter referred to as "AE processing") is carried out to obtain a suitable exposure value. Then, automatic focus detection processing (hereinafter referred to as "AF processing") is carried out to drive a focus-adjusting lens to focus the subject on the image capture device. The subject brightness value is measured from the video signal again, and photographic exposure conditions are thereby determined. In addition to AE, AF, and other analytical processing, image capture devices often display a visual electronic image of the scene to be captured. This visual image is updated frequently, such as 30 frames per second, and is referred to as a preview image or stream of preview images.

Commonly, a single electronic image sensor is used for creating the electronic representation of a visual image, AE processing and AF processing. These tasks are performed sequentially since the same electronic image sensor is being utilized for different functions. Typically, the rate at which the AE processing and AF processing can be performed is restricted by the rate at which a visual image can be read and processed from the electronic image sensor. This can cause a considerable delay in time between when the electronic image sensor initiates processing and when the final capture is finally acquired.

In prior art, the user adjusts the zoom setting and points the camera to compose the image, and then actuates a capture device through user inputs. The camera focus is adjusted to a mid-range position, and the sensor is cleared of any charge. For example, with a CCD sensor, this would be done using a fast flush technique. An image, to be used for focusing the camera lens, is then integrated for a period of time, for example 10 milli-seconds, during the focusing mode. The vertical clock sequence is then set to a line skipping operation (e.g., read two lines, dump six lines, read two, dump six, etc.), or read only selected lines in the central area of the image.

After data acquisition, the average absolute value output (average contrast) of a horizontal spatial bandpass filter processing these image lines is used to determine how well the image is focused. The system controller stores this average contrast value, and the lens focus is adjusted while the remainder of the sensor charge is cleared out using fast flush timing The fast flush timing for the top and bottom of the sensor are required with a CCD in order to reduce the time spent reading out each focus image. Sensor lines that are flushed are not available for any purpose, such as exposure analysis or video signal output. The process of integrating and reading out the focus image is then repeated for a second focusing cycle. If the average contrast increases, the lens focus position is stepped again in the same direction. If the average contrast decreases, the focus position is moved in the opposite direction. These focusing cycles are repeated numerous times as the lens focus is adjusted until it provides the maximum average contrast. Once the average contrast has reached a maximum value, the focus is acceptable. At this point, the entire sensor is cleared. The final image is then integrated for a period of time. The final image is read out from the sensor.

Prior art also includes focus analysis techniques besides the average contrast calculation described above. Still, they rely on a through focus operation, acquiring multiple images at different focus positions.

In order to solve the time problem, some capture devices actually have two image sensors: one that operates at a fast frame rate to provide for AE or AF processing and the other that operates at a slow frame rate for producing a visual image signal. This of course involves the complexity of a second sensor and its control. The added complexity includes optical and mechanical complexity as well as electronic complexity.

SUMMARY OF THE INVENTION

It is an object of the present invention to provide improved techniques for reading data for multiple functions from a single image sensor.

This objective is achieved in a method for using a capture device to capture at least two video signals corresponding to a scene, comprising:
 a) providing a two-dimensional image sensor having a plurality of pixels;
 b) reading a first group of pixels from the image sensor at a first frame rate to produce a first video signal of the image scene;
 c) reading a second group of pixels from the image sensor at a second frame rate to produce a second video signal; and
 d) using at least one of the video signals for adjusting one or more of the capture device parameters.

By providing the first and second video signals for adjusting the capture device parameters, the time required between initiating the capture and acquiring the final capture can be reduced.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
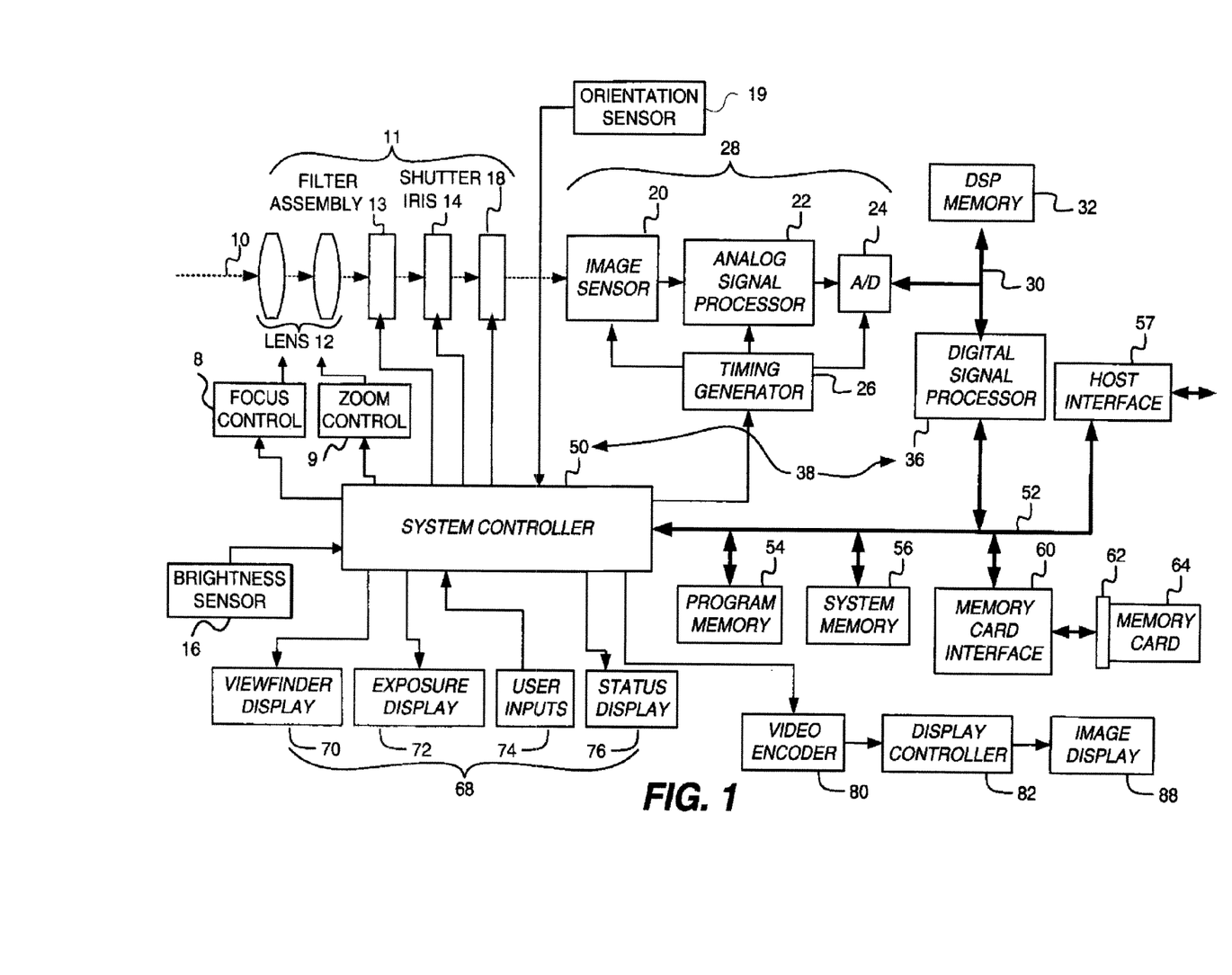
FIG. 1 is a block diagram of a digital capture device in accordance with the present invention.

Turning now to FIG. 1, a block diagram of an image capture device shown as a digital camera embodying the present invention is shown. Although a digital camera will now be explained, the present invention is clearly applicable to other types of image capture devices. In the disclosed camera, light 10 from the subject scene is input to an imaging stage 11, where the light is focused by lens 12 to form an image on solid state two dimensional image sensor 20 typically leaving rows and columns of picture elements (pixels). Image sensor 20 converts the incident light to an electrical signal for each pixel. The image sensor 20 of the preferred embodiment is an active pixel sensor (APS) type (APS devices are often referred to as CMOS sensors because of the ability to fabricate them in a Complementary Metal Oxide Semiconductor process). Other types of image sensors having two-dimensional arrays of pixels can be used, provided that they support asynchronous readout of multiple groups of pixels consistent with the present invention. Often, image sensors with two-dimensional arrays of pixels have the pixels arranged in a rectangular grid pattern with two orthogonal axes. This is not necessary for the present invention; any two-dimensional array layout can be used with this invention.

The image sensor 20 receives light 10 from a subject scene. The resulting electrical signal from each pixel of the image sensor 20 is typically related to both the intensity of the light reaching the pixel and the length of time the pixel is allowed to accumulate or integrate the signal from incoming light. This time is called the integration time or exposure time. In this context, the integration time is the time during which the shutter 18 allows light to reach the image sensor 20 and the image sensor is simultaneously operating to record the light. The combination of overall light intensity and integration time is called exposure. It is to be understood that equivalent exposures can be achieved by various combinations of light intensity and integration time. For example, a long integration time can be used with a scene of very low light intensity in order to achieve the same exposure as using a short integration time with a scene of high light intensity.

FIG. 1 includes several elements to regulate the exposure. The iris 14 modifies the light intensity at the sensor. The shutter 18 provides a mechanism for allowing or preventing light from reaching the image sensor, while the timing generator 26 provides a way to control when the image sensor is actively recording the image. In this way, the shutter 18 and the timing generator 26 jointly determine the integration time. Iris 14 controls the intensity of light reaching the image sensor 20 by using a mechanical aperture to block light in the optical path. The iris 14 can include a mechanical aperture with variable size, or it can include several fixed apertures of different size that can selectively be inserted into the optical path. The shutter 18, also referred to as a mechanical shutter, typically includes a curtain or moveable blade connected to an actuator that removes the curtain or blade from the optical path at the start of integration time and inserts the curtain or blade into the optical path at the end of integration time. Some types of image sensors allow the integration time to be controlled electronically by resetting the image sensor and then reading out the image sensor some time later. The interval of time between reset and readout bounds the integration time and it is controlled by the timing generator 26.

Although FIG. 1 shows several exposure controlling elements, some embodiments may not include one or more of these elements, or there can be alternative mechanisms of controlling exposure. These variations are to be expected in the wide range of image capture devices to which the present invention can be applied.

As previously mentioned, equivalent exposures can be achieved by various combinations of light intensity and integration time. Although the exposures are equivalent, a particular exposure combination of light intensity and integration time may be preferred over other equivalent exposures for capturing a given scene image. For example, a short integration time is generally preferred when capturing sporting events in order to avoid blurred images due to motion of athletes running or jumping during the integration time. In this case, the iris block can provide a large aperture for high light intensity and the shutter can provide a short integration time. This case serves as an example of a scene mode, specifically a sports scene mode that favors short integration times over small apertures. In general, scene modes are preferences for selecting and controlling the elements that combine to make an exposure in order to optimally to capture certain scene types. Another example of a scene mode is a landscape scene mode. In this scene mode, preference is given to a small aperture to provide good depth of focus with the integration time being adjusted to provide optimum exposure. Yet another example of a scene mode, is a general scene mode that favors small apertures for good depth of focus with integration time increasing with lower scene light levels, until the integration time becomes long enough for certain light levels that handheld camera shake becomes a concern, at which point the integration time remains fixed and the iris provides larger apertures to increase the light intensity at the sensor.

The system controller 50 in FIG. 1 controls or adjusts the exposure regulating elements outlined above. The brightness sensor 16 contains at least one sensor responsive to light in the visible spectrum. For example, brightness sensor 16 can have a single sensor with a broad photoresponse, or it can have multiple sensors with narrow and differing photoresponses such as red, green, and blue. The brightness sensor 16 provides at least one signal representing scene light intensity to the system controller 50. If, for example, the brightness signal (s) received by system controller 50 indicate that the overall scene brightness level is too high for sensor 20, then system controller 50 can instruct the filter assembly 13 to insert a particular ND filter into the optical path. If a red brightness signal exceeds a blue brightness signal level by a specified amount, the system controller 50 can instruct the filter assembly 13 to insert a particular color balance filter into the optical path to compensate for the greater amount of red light being available. In addition to using filters from the filter assembly 13, the system controller 50 can instruct the iris 14 to open or close by various specified amounts, it can open or close the mechanical shutter 18, and it can indirectly control the timing generator 26 through the system controller 50. The system controller 50 can use any of these previously mentioned exposure control actions individually or in any combination.

The system controller 50 also receives inputs from the user inputs 74. Scene mode as described above is generally provided by the user as a user input. When taking multiple image captures in quick succession, scene lighting intensity for the next capture can also be estimated from the digitized image data taken on the previous capture. This image data, passing through the digital signal processor 36 can be used by the system controller 50 to augment or override digital signals from the brightness sensor 16.

The system controller 50 uses the light intensity signal(s) from brightness sensor 16, user inputs 74 (including scene mode), and system controller 50 inputs to determine how to control the exposure regulating elements to provide an appropriate exposure. The system controller 50 can determine automatically how to control or adjust all the exposure regulating elements to produce a correct exposure. Alternatively, by way of the user inputs 74, the user can manually control or adjust the exposure regulating elements to produce a user selected exposure. Furthermore, the user can manually control or adjust only some exposure regulating elements while allowing the system controller 50 to control the remaining elements automatically. The system controller 50 also provides information regarding the exposure to the user through the viewfinder display 70 and the exposure display 72. This information for the user includes the automatically or manually determined integration time, aperture, and other exposure regulating elements. This information can also include to what degree an image capture will be underexposed or overexposed in case the correct exposure cannot be achieved based on the limits of operation of the various exposure regulating elements.

Referring again to the embodiment shown in FIG. 1, the lens unit 12 is a motorized zoom lens in which a mobile element or elements are driven, relative to a stationary element or elements, by a zoom control 9. This allows the effective focal length of the lens to be changed by the system controller 50, to change the field of view of the camera. Additionally, an element or elements are driven, by a focus control 8 in order to focus rays from a particular distance on the image sensor 20.

Referring again to the embodiment shown in FIG. 1, the camera includes an orientation sensor 19. This provides data on the direction the camera is being held to the system controller 50.

The image capture device, shown in FIG. 1 as a digital camera, can also include other features, for example, detachable and interchangeable lenses. It will be understood that the present invention is applied to any type of digital camera, or other image capture device, where similar functionality is provided by alternative components. For example, the digital camera can be a relatively simple point and shoot digital camera, where the shutter 18 is a relatively simple movable blade shutter, or the like, instead of the more complicated focal plane arrangement. The present invention can also be practiced on imaging components included in non-camera devices such as mobile phones and automotive vehicles.

The analog signal from image sensor 20 is processed by analog signal processor 22 and applied to analog to digital (A/D) converter 24. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The components of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is a processor in addition to system controller 50. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of two such controllers or processors has been described, it should be apparent that one controller or processor or more than two controllers could be designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software necessary for practicing image processing shown in FIG. 18. Memory 32 includes of any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing the focus control 8, zoom control 9, lens 12, filter assembly 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface, including all or any combination of viewfinder display 70, exposure display 72, status display 76 and image display 88, and user inputs 74, is controlled by a combination of software programs executed on system controller 50. The Viewfinder Display, Exposure Display and the User Inputs displays are a user control and status interface 68. User inputs 74 typically include some combination of buttons, rocker switches, joysticks, rotary dials or touchscreens. System controller 50 operates light metering, scene mode, autofocus, and other exposure functions. The system controller 50 manages the graphical user interface (GUI) presented on one or more of the displays, e.g., on image display 88. The GUI typically includes menus for making various option selections and review modes for examining captured images.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The digital camera as described can be configured and operated to capture a single image or to capture a stream of images. For example, the image sensor stage 28 can be configured to capture single full resolution images and the mechanical shutter 18 can be used to control the integration time. This case is well suited to single image capture for still photography. Alternatively, the image sensor stage can be configured to capture a stream of limited resolution images and the image sensor can be configured to control the integration time electronically. In this case a continuous stream of images can be captured without being limited by the readout speed of the sensor or the actuation speed of the mechanical shutter. This case is useful, for example, for capturing a stream of images that will be used to provide a video signal, as in the case of a video camera. The configurations outlined in these cases are examples of the configurations employed for single capture and capturing a stream of images, but alternative configurations can be used for single image capture and capturing a stream of images. The present invention can be practiced in image capture devices providing either for single image capture or for capturing a stream of images. Furthermore, image capture devices incorporating the present invention can allow the user to select between single image capture and capturing a stream of images.

The image sensor 20 shown in FIG. 1 typically includes a two-dimensional array of light sensitive pixels fabricated on a silicon substrate that provide a way of converting incoming light at each pixel into an electrical signal that is measured. As the sensor is exposed to light, free electrons are generated and captured within the electronic structure at each pixel. Capturing these free electrons for some period of time and then measuring the number of electrons captured, or measuring the rate at which free electrons are generated can measure the light level at each pixel. In the former case, accumulated charge is shifted out of the array of pixels to a charge to voltage measurement circuit as in a charge coupled device (CCD), or the area close to each pixel can contain elements of a charge to voltage measurement circuit as in an active pixel sensor (APS or CMOS sensor).

Whenever general reference is made to an image sensor in the following description, it is understood to be representative of the image sensor 20 from FIG. 1. It is further understood that all examples and their equivalents of image sensor architectures and pixel patterns can be used for image sensor 20.

Figure 2:
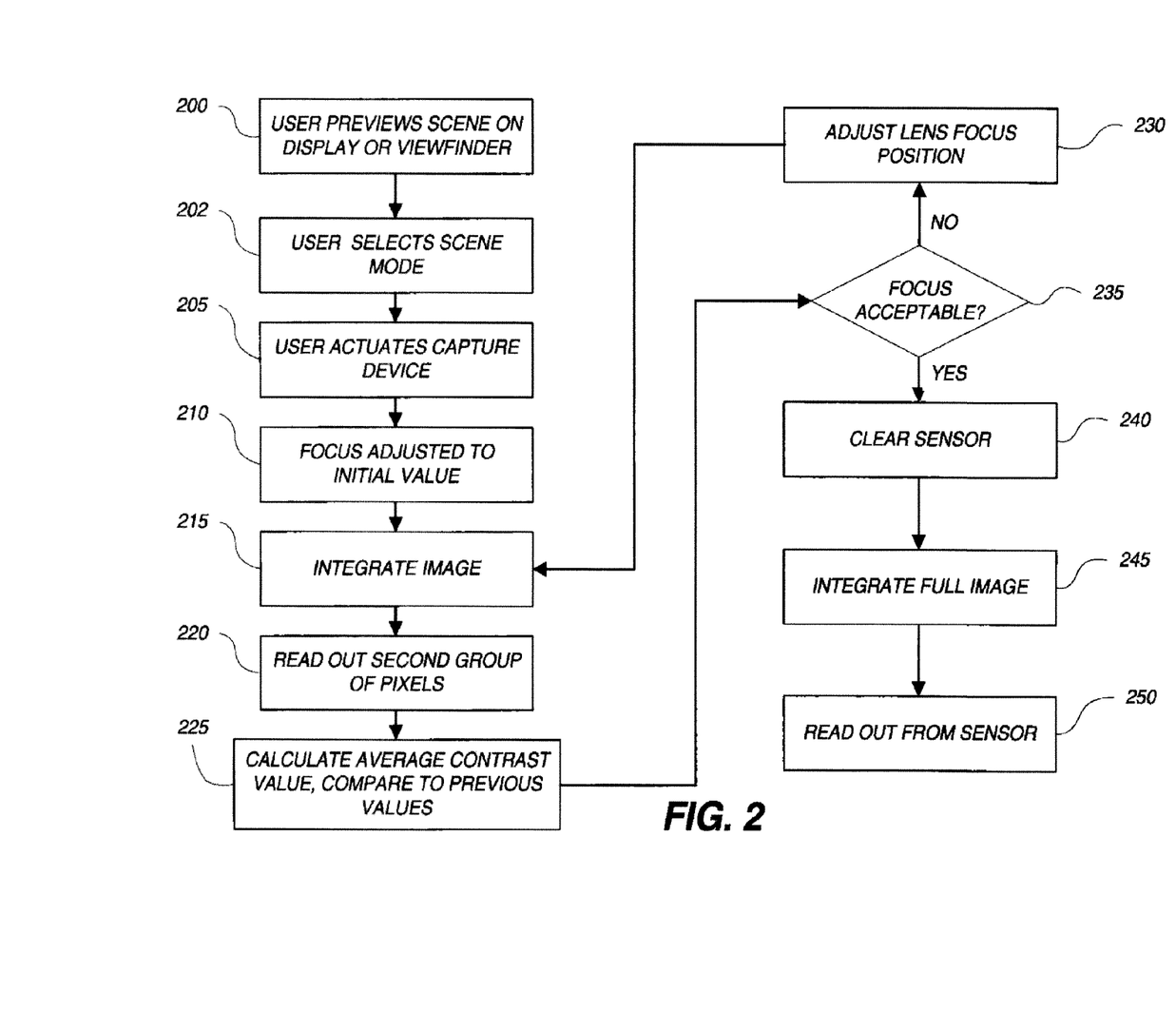
FIG. 2 is a flow diagram for focus adjustment according to a preferred embodiment of the present invention.

FIG. 1 and FIG. 2 show the preferred embodiment of the proposed focus operating sequence of the present invention. Referring to FIG. 2, block 200 describes a user viewing a preview image of a scene and adjusting the zoom control 9 and pointing the capture device to compose the image. Block 202 describes having a scene mode selected by the user through user inputs 74, or automatically by the capture device through the system controller 50. Next, in block 205, the user actuates the capture device through user inputs 74. The capture device focus is adjusted to an initial position 210, and the sensor 20 is cleared of any charge. The sensor is allowed to integrate exposure (collecting light) for a time interval in block 215. A first group of pixels is read out from image sensor 20, converted to a first video signal after being adjusted by the analog signal processor 22, and stored in DSP memory 32. A second group of pixels is read out 220 simultaneously or asynchronously, to produce a second video signal to be used for AF processing 225. The average absolute value output (average contrast) of a horizontal spatial bandpass filter processing focus pixels is used to determine how well the image is focused 235. This average contrast value is stored by the system controller 50, and the focus control 8 is adjusted 230. The process of integrating and reading out the second group of pixels used for AF processing is then repeated for additional focusing cycles. Once the average contrast has reached a maximum value, the focus is acceptable. At this point, the entire sensor 20 is cleared 240. During the focus process, additional preview images can be acquired from the first group of pixels to update the video output for scene preview on the display. The final capture is then integrated for a period of time 245. The final capture is read out from the sensor 250.

Figure 3A:
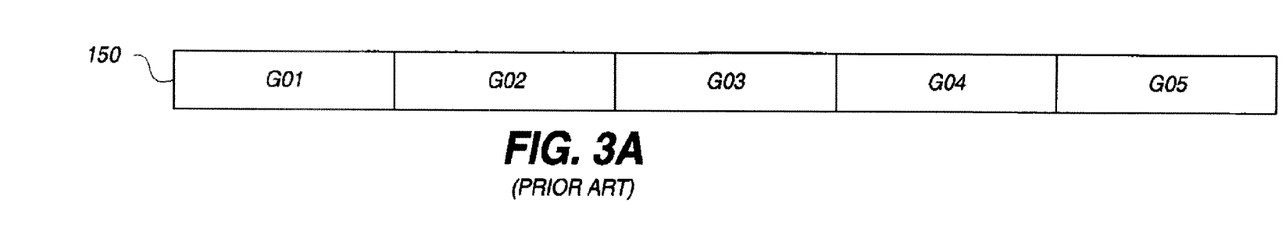
FIGS. 3A-F shows relative time sequences for reading video signals from a sensor with FIG. 3A being a timing sequence from the prior art.
Figure 3B:
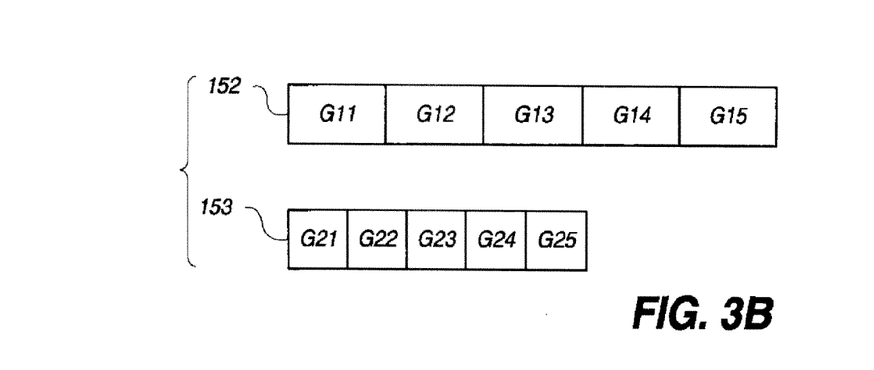
Figure 3C:
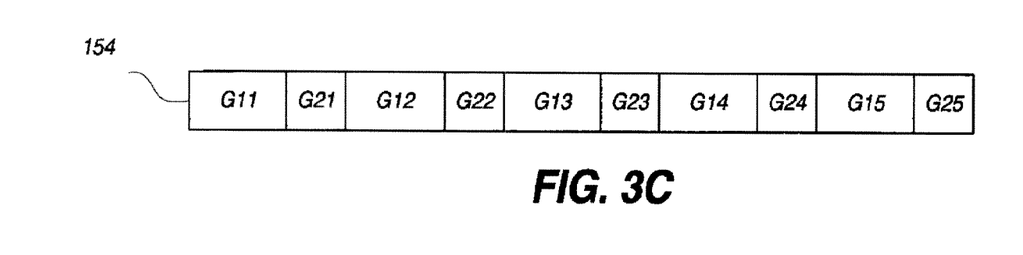

FIGS. 3A-C illustrate the time sequence advantages of the current invention. In FIGS. 3A-3C, the relative time required to read a frame of video signal is indicated by the width of the numbered boxes (such as groups of pixels G01, G24, etc).

An advantage of the present invention is that efficiency and parallelism in reading pixels allow for a faster frame rate without a faster pixel conversion rate. As used herein, the term "frame rate" is the reciprocal of the time from the beginning of one frame of video signal to the beginning of the next frame of video signal. Pixel rate is the inverse of the time from the readout of one pixel to the readout of the next pixel.

The first number in each box refers to the group of pixels (such as first or second group). In prior art, there is no grouping of pixels, and the group number is designated by 0, such as G01. The second number in each box refers to the frame number. In some boxes, there is a third number (preceded by a decimal point). This number refers to a part of a frame for the group of pixels. For example, box G21.2 refers to the time interval required to read the second group of pixels, first frame, second part of frame. The timing advantage of the current invention is illustrated by the fact that boxes G11 and G21 (or G12 and G22, etc) are shorter than box G01.

FIG. 3A refers to prior art, where groups of pixels for both preview and analysis are read out in a single frame. In this figure, the stream of the prior art time interval 150 is broken into successive frames. Each frame G01 through G05, contains the data for both video preview and for other analysis, such as AF. Because video preview and AF have distinct needs, optimally serving the needs of both functions requires more pixels to be read out than are needed for either function alone.

FIG. 3B illustrates one embodiment of the current invention. This is an example of a method for using a capture device to capture at least two video signals corresponding to a scene, comprising; providing a two-dimensional image sensor having a plurality of pixels; reading a first group of pixels from the image sensor at a first frame rate to produce a first video signal of the image scene; reading a second group of pixels from the image sensor at a second frame rate to produce a second video signal; and using at least one of the video signals for adjusting one or more of the capture device parameters. By providing appropriate hardware parallelism, the first group overlapping time interval 152 from the first group of pixels can be separated from the second group overlapping time interval 153 from the second group of pixels. With the two signals separated, each video stream can be read synchronously or asynchronously, at the frame rate needed for each function. With the hardware parallelism, not only is there a time savings by reading only the precise number of pixels required for each function, there is also a time savings by allowing the time interval for each group to overlap. In FIG. 3B, the two groups of pixels are read at two different frame rates. For example, the second video signal is used for adjusting one or more capture device parameters and is at a faster frame rate than the first video signal. In one preferred embodiment, the second video signal is used for adjusting focus of the capture device. In another preferred embodiment, the second video signal is used for adjusting exposure of the capture device. In another preferred embodiment, the second video signal is used for adjusting exposure and focus of the capture device. In each of these preferred embodiments, at least one of the video signals is used for adjusting one or more of the capture device parameters. In addition, these embodiments can also include using first video signal to produce a scene preview. In these embodiments, the processing flow is as shown in FIG. 2. This is an example of producing a preview image from pixels in the image sensor and a user viewing such preview image and actuating the capture device to cause reading a first group of pixels from the image sensor at a first frame rate to produce a first video signal of the image scene, reading a second group of pixels from the image sensor at a second frame rate to produce a second video signal; and wherein at least one of the video signals is used for adjusting one or more of the capture parameters.

Referring again to FIG. 3B, in another embodiment the frame rate for the second video signal is adjusted based on a scene mode for the image capture device. For example, when a sports scene mode is selected, the frame rate for the second video signal is increased, in order to improve performance of the autofocus system.

FIG. 3C illustrates another embodiment of the current invention in the case without hardware parallelism. The non-overlapping time interval option 1 block 154 is broken into two groups of pixels: one for video preview and one for AF and other analysis purposes. Because each group of pixels is selected for the specific function, no excess pixels are read out. In this case, the frame rate for the two groups of pixels is identical because the frames are interleaved in this alternating fashion. Still, because of the efficiency of reading the two groups of pixels separately, the frame rate can be higher than the frame rate in FIG. 3A.

Figure 3D:
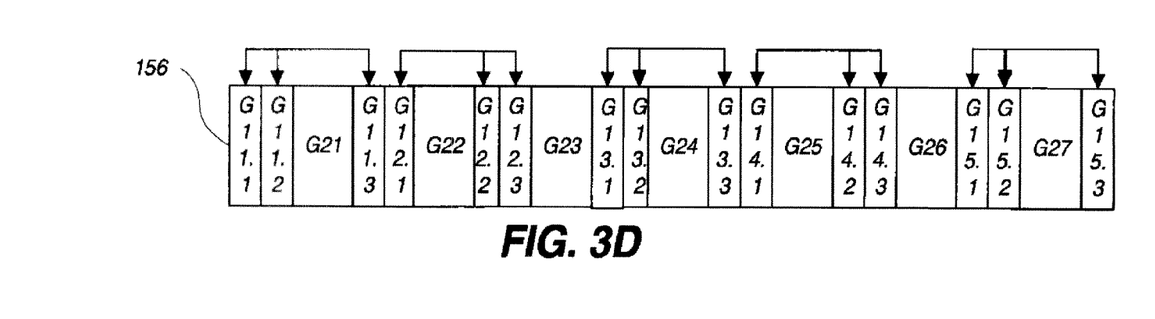

FIG. 3D illustrates a further advantage of the current invention in the case without hardware parallelism. In non-overlapping time interval option 2 block 156, the time interval for each frame of first group of pixels is divided into three parts, such as G11.1, G11.2, G11.3. The arrows indicate the collection of the parts to constitute a given frame. Each frame of the second group of pixels is read in a contiguous time interval, such as G21. In this option, each frame of the first group of pixels is split such that frames from the second group of pixels can be read and interleaved with the first group of pixels. This allows the second group of pixels to be read slightly more frequently than the first group of pixels. In this example, frames from the first group of pixels are split into equal parts to simplify control over timing. It is also possible to consider the frames from the first group of pixels to be split in two unequal parts. For example, G11.1 and G11.2 could be merged into one part that requires more time than part G11.3.

Figure 3E:
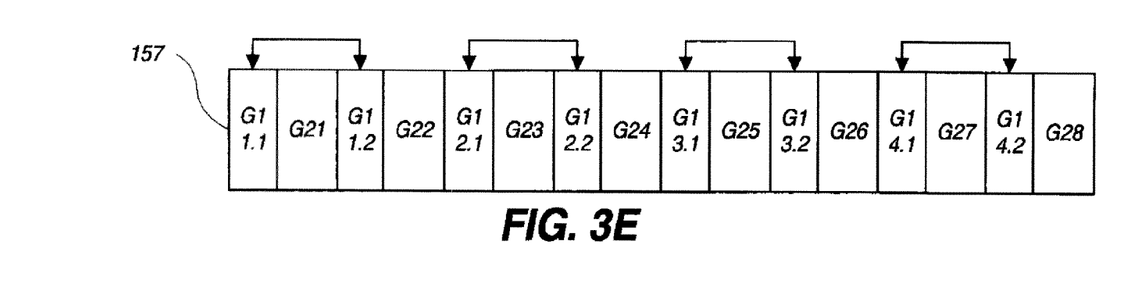

FIG. 3E illustrates another option of the current invention in the case without hardware parallelism. In non-overlapping time interval option 3, block 157, the time interval for each frame of first group of pixels is divided into two parts, such as G11.1, G11.2. The arrows indicate the collection of the parts to constitute a given frame. Each frame of the second group of pixels is read in a contiguous time interval, such as G21. In this option, each frame of the first group of pixels is split such that frames from the second group of pixels can be read and interleaved with the first group of pixels. This permits the second group of pixels to be read twice as frequently as the first group of pixels.

A person skilled in the art can see that frame of the first group of pixels can be split in many different ways in order to optimize the frequency of reading frames of the first group of pixels and frames of the second group of pixels. Usually the optimal interleaving will be such that a complete frame of the first group of pixels will be read at a standard video rate, such as every 33 milliseconds. The frames of the second group of pixels are interleaved to provide a consistent time interval between each frame of the second group of pixels, to help in synchronization with other camera operations, such as lens movement.

Figure 3F:
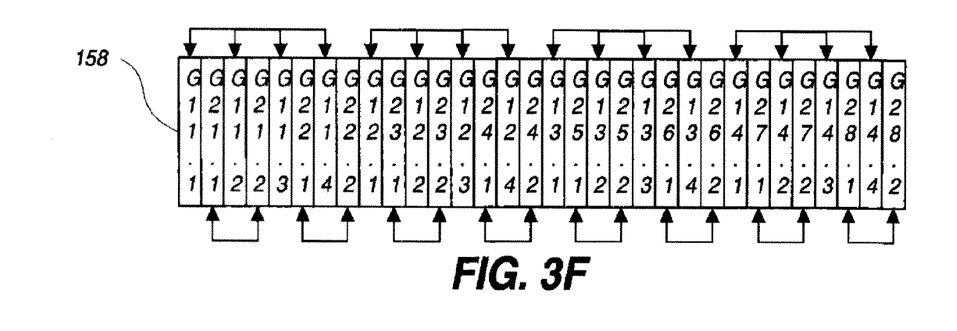

FIG. 3F illustrates a further extension of the interleaving concept. In non-overlapping time interval option 4 block 158, frames from each group of pixels are divided into parts. The arrows indicate the collection of the parts to constitute a given frame. This allows greater flexibility over timing for reading each group of pixels. Depending on the characteristics of the timing generator 26 and image sensor 20, it is quite reasonable for the time interval to be as small as desired. For example, it can be the time required to read a single row of the image sensor 20, or it can be smaller. The groups can conveniently be interleaved at any row, pixel, or other logical boundary.

In order to produce a color image, the array of pixels in an image sensor typically has a pattern of color filters placed over them. The set of color photoresponses selected for use in a sensor usually has three colors, but it can also include four or more. As used herein, a panchromatic photoresponse refers to a photoresponse having a wider spectral sensitivity than those spectral sensitivities represented in the selected set of color photoresponses. A panchromatic photosensitivity can have high sensitivity across the entire visible spectrum. The term panchromatic pixel will refer to a pixel having a panchromatic photoresponse. Although the panchromatic pixels generally have a wider spectral sensitivity than the set of color photoresponses, each panchromatic pixel can have an associated filter. Such filter is either a neutral density filter or a color filter.

Figure 4:
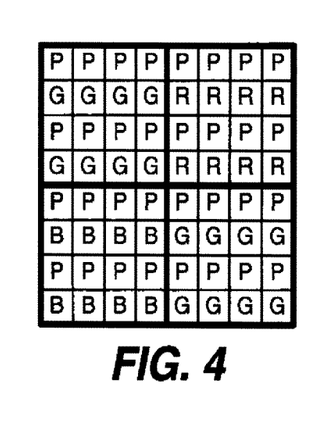
FIG. 4 illustrates a method for combining panchromatic and color pixels in an image sensor.

FIG. 4 illustrates one possible way to mix panchromatic and color pixels in the preferred embodiment of the present invention. One group of pixels defines a low-resolution color image and the second group of pixels defines a high-resolution panchromatic image.

Figure 5A:
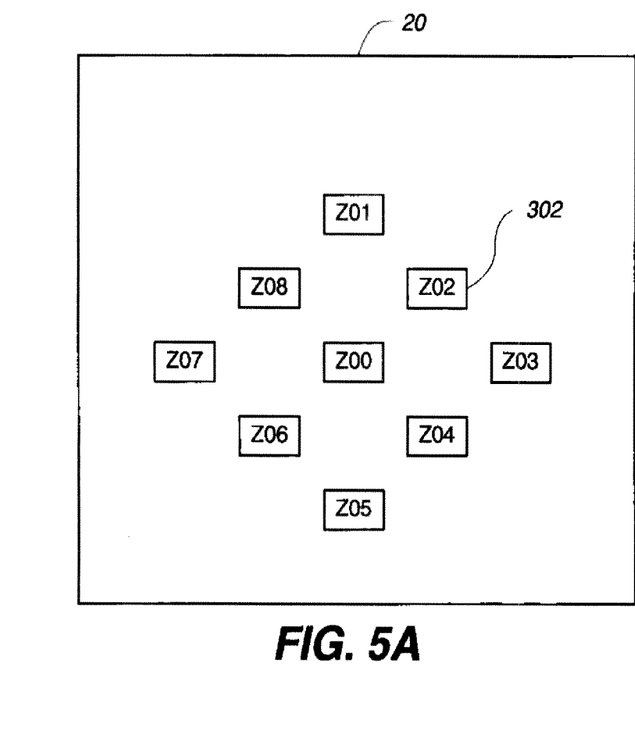
FIGS. 5A-C shows the zones of pixels for performing AE and AF metering and video display.

FIG. 5A illustrates an arrangement of zones of pixels used for focusing and exposure analysis. Z00 through Z08 illustrate zones within an image sensor 20 that would be used for focus analysis. The analysis can be done by allowing the user to select a single one of these zones for AF and/or AE. Alternatively, a multi-zone analysis can use data from all of these zones, adaptively weighting each zone based on a variety of criteria, such as local contrast behavior, camera orientation (from sensor 19 or from a user selection), and camera setting information. A particular focus zone Z02 (302) is shown in an expanded illustration FIG. 5B.

Figure 5B:
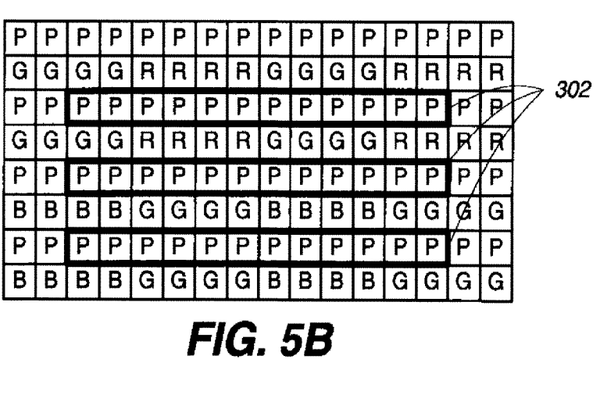

FIG. 5B shows emphasized panchromatic pixels 302 used for focusing in a sensor with panchromatic and color pixels. In this example, the second group of pixels includes only panchromatic pixels. Because the second group of pixels read for focusing is usually read out more frequently than the first group of pixels, panchromatic pixels are usually preferred for AF analysis. Because reading the second group of pixels more frequently reduces the potential exposure time available for those pixels, the additional photosensitivity of the panchromatic pixels can be an advantage. In some cases, color pixels are preferred. It will be understood that in the present invention the first group of pixels includes either panchromatic or color pixels or both and the second group of pixels includes either panchromatic or color pixels or both. The key differentiation between pixels in the two groups is function. The second video signal is used for adjusting focus, exposure, and other parameters of the capture device. The first video signal is used to provide a low resolution or preview image of the overall scene.

After appropriately adjusting parameters of the capture device, all pixels from the two-dimensional image sensor can be read out, to provide a final capture of an image of the scene after adjustment of capture parameter(s).

Those skilled in the art will appreciate that the number of pixels employed can vary from zone to zone and be optimized for a particular application.

Figure 5C:
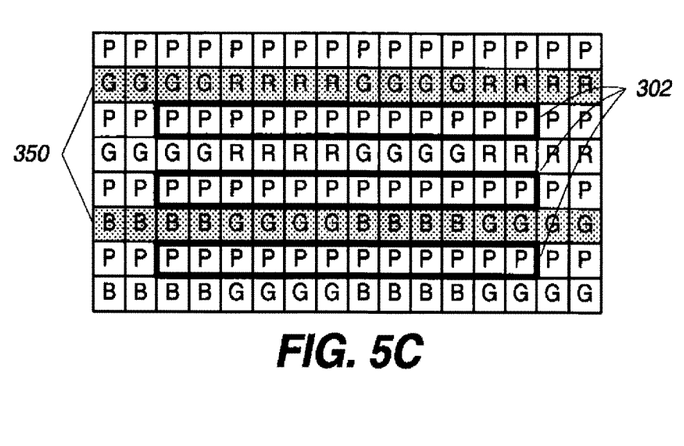

FIG. 5C illustrates how emphasized pixels used for focusing (302) are distinct from emphasized hatched pixels read out for display purposes (350). This allows them to have different exposure times and readout rates.

The invention has been described in detail with particular reference to certain preferred embodiments thereof, but it will be understood that variations and modifications are effected within the spirit and scope of the invention.

PARTS LIST 8 focus control
9 zoom control
10 light from subject scene
11 imaging stage
12 lens
13 filter assembly
14 iris
16 brightness sensor
18 shutter
19 orientation sensor
20 image sensor
22 analog signal processor
24 analog to digital (A/D) converter
26 timing generator
28 image sensor stage
30 digital signal processor (DSP) bus
32 digital signal processor (DSP) memory
36 digital signal processor (DSP)
38 processing stage
50 system controller
52 system controller bus
54 program memory
56 system memory
57 host interface
60 memory card interface
62 memory card socket
64 memory card
68 user control and status interface
70 viewfinder display
72 exposure display
74 user inputs
76 status display
80 video encoder
82 display controller
88 image display
150 prior art time interval
152 first group overlapping time interval
153 second group overlapping time interval
154 non-overlapping time interval option 1
156 non-overlapping time interval option 2
157 non-overlapping time interval option 3
158 non-overlapping time interval option 4
200 user preview block
202 user scene mode block
205 user actuation block
210 initial focus block

215 integrate image block
220 read second group of pixels block
225 contrast calculation block
230 focus adjustment block
235 focus acceptable decision block
240 clear sensor block
245 integrate full image block
250 read from sensor block
302 focus zone
350 pixels read out for display purposes

The invention claimed is:

1. A capture device to capture a stream of images to produce a video signal corresponding to a particular image scene, the capture device comprising:
   a two-dimensional image sensor having a plurality of pixels;
   circuitry coupled to the two-dimensional image sensor to:
   (a) read a first group of pixels from the image sensor at a first frame rate to produce a first video signal of the particular image scene that is used to produce the video signal;
   (b) while reading the first group of pixels, read a second group of pixels from the image sensor that are different from the first group of pixels at a second frame rate to produce a second video signal of at least a portion of the particular image scene, wherein the first group of pixels surrounds on all sides the second group of pixels;
   (c) use the second video signal for adjusting one or more capture device parameters wherein the one or more capture device parameters effect a change in at least the first group of pixels; and
   (d) repeat (a) through (c) while capturing the stream of images to produce the video signal.

2. The capture device of claim 1 wherein the second video signal is at a faster frame rate than the first video signal.

3. The capture device of claim 1 wherein the circuitry uses the second video signal to adjust a focus of the capture device.

4. The capture device of claim 3 wherein the circuitry uses the second video signal to adjust an exposure of the capture device.

5. The capture device of claim 4 wherein the circuitry further uses pixels from the two-dimensional image sensor to provide a final capture of an image of the scene after adjustment of capture parameter(s).

6. The capture device of claim 1 wherein the circuitry uses the second video signal to adjust an exposure of the capture device.

7. The capture device of claim 1 wherein the circuitry further uses pixels from the two-dimensional image sensor to provide a final capture of an image of the scene after adjustment of capture parameter(s).

8. The capture device of claim 1 wherein the image sensor includes panchromatic and color pixels.

9. The capture device of claim 8 wherein the first group of pixels includes either panchromatic or color pixels or both and the second group of pixels includes either panchromatic or color pixels or both.

10. The capture device of claim 8 wherein the second video signal includes only panchromatic pixels.

11. The capture device of claim 1 wherein the circuitry adjusts the frame rate for the second video signal based on a scene mode for the capture device.

* * * * *